(12) United States Patent
Dong et al.

(10) Patent No.: US 9,122,564 B1
(45) Date of Patent: Sep. 1, 2015

(54) EVALUATING A SYSTEM EVENT

(75) Inventors: Dazhi Dong, Shanghai (CN); Scott E. Joyce, Foxboro, MA (US); Bruce R. Rabe, Dedham, MA (US); Xiaogang Wang, Shanghai (CN); Qi Qu, Shanghai (CN); Vincent Ma, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 111 days.

(21) Appl. No.: 13/432,686

(22) Filed: Mar. 28, 2012

(51) Int. Cl.
*G06F 11/00* (2006.01)
*G06F 11/26* (2006.01)

(52) U.S. Cl.
CPC .............. *G06F 11/00* (2013.01); *G06F 11/261* (2013.01)

(58) Field of Classification Search
USPC .......................................... 714/28, 32, 25, 48
See application file for complete search history.

(56) References Cited

U.S. PATENT DOCUMENTS

| | | | |
|---|---|---|---|
| 7,574,623 B1* | 8/2009 | Goel et al. ................... | 714/47.2 |
| 8,156,380 B2* | 4/2012 | Kalos et al. ..................... | 714/42 |
| 8,225,143 B2* | 7/2012 | Bates et al. ..................... | 714/41 |
| 2007/0055914 A1* | 3/2007 | Chandwani et al. ............ | 714/47 |
| 2007/0074069 A1* | 3/2007 | Ohno ................................ | 714/7 |
| 2009/0183036 A1* | 7/2009 | Hathorn et al. ................. | 714/48 |
| 2010/0281303 A1* | 11/2010 | Cates .............................. | 714/33 |
| 2011/0083034 A1* | 4/2011 | Zohar et al. ................... | 714/4.1 |
| 2011/0246835 A1* | 10/2011 | Hasegawa et al. .............. | 714/39 |

\* cited by examiner

*Primary Examiner* — Sarai Butler
(74) *Attorney, Agent, or Firm* — Krishnendu Gupta; Jason A. Reyes

(57) ABSTRACT

There is disclosed a method and system for use in evaluating a system event. A current storage configuration is captured in connection with a data storage system. A system failure event relating to the data storage system is simulated without impacting the data storage system. The system failure event is simulated using the current storage configuration in connection with the data storage system. A system failure event output is provided for enabling evaluation of the potential impact of the system failure event in the data storage system in response to simulating the system failure event.

14 Claims, 7 Drawing Sheets

EVALUATING A SYSTEM EVENT

TECHNICAL FIELD

The present invention relates to evaluating a system event.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A typical data storage system includes one or more rack systems, each rack system having a plurality of storage devices or enclosures. A common topology in which the enclosures are connected is a loop. Communication signals traverse the loop uni-directionally and pass from enclosure to enclosure in a daisy-chain fashion. Enclosures receiving communication signals targeted to another enclosure forward those signals along the loop.

It will be appreciated from the foregoing that data storage systems are complex. It will also be appreciated that a system event in connection with the data storage system may have serious implications. It is therefore important to be well prepared to deal with such a scenario.

SUMMARY OF THE INVENTION

There is disclosed a method and system for use in evaluating a system event. A current storage configuration is captured in connection with a data storage system. A system failure event relating to the data storage system is simulated without impacting the data storage system. The system failure event is simulated using the current storage configuration in connection with the data storage system. A system failure event output is provided for enabling evaluation of the potential impact of the system failure event in the data storage system in response to simulating the system failure event.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
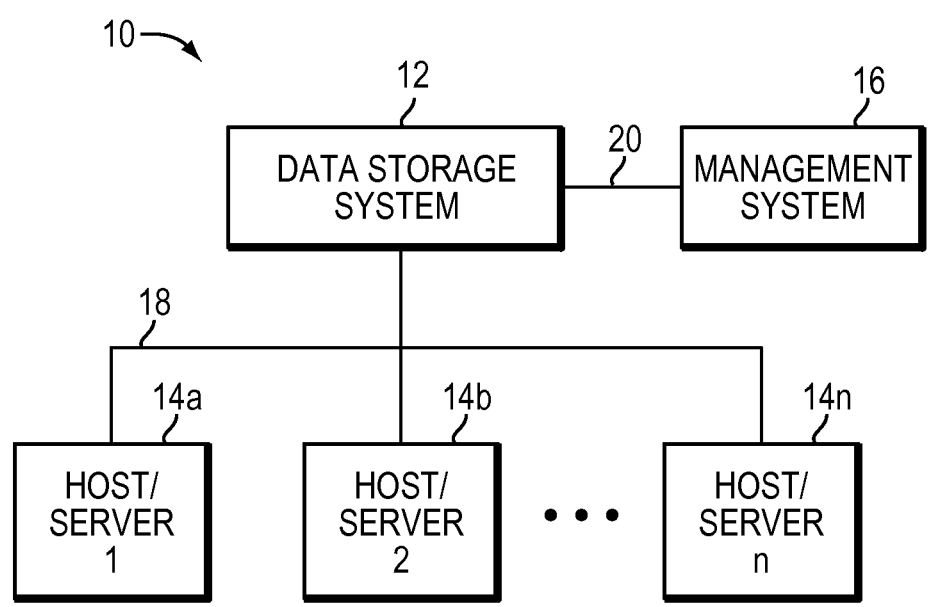
FIG. 1 is an example of a system that may utilize the technique described herein.

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described below is a technique for use in evaluating a system event. The technique simulates pre-defined failures or disasters in connection with a data storage system. For example, the pre-defined failures may include the failure of a disk drive, the failure of two disk drives within a minute of each other, the failure of an array enclosure such as a disk array enclosure (DAE), the failure of a link control card (LCC), the failure of a software update, etc. The technique enables evaluation of the loss not only of system capability, serviceability, reliability, availability, and stability but also the impact on applications such as shared folders, e-mail boxes, databases, virtual applications and other applications associated with the data storage system. Additionally, the technique can provide recovery advice or help advice for enabling recovery from the event.

The technique may be performed offline but is based on the actual current storage configuration in the data storage system. In one embodiment, the technique may communicate with the storage system and capture the current storage configuration. The configuration may be stored and act as a checkpoint or a baseline. The technique may simulate the pre-defined failure event using the storage configuration. The technique may collect and analyze the results and prepare a detailed loss report including any recovery advice.

Referring to FIG. 1, there is illustrated an example of a system that may utilize the technique described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
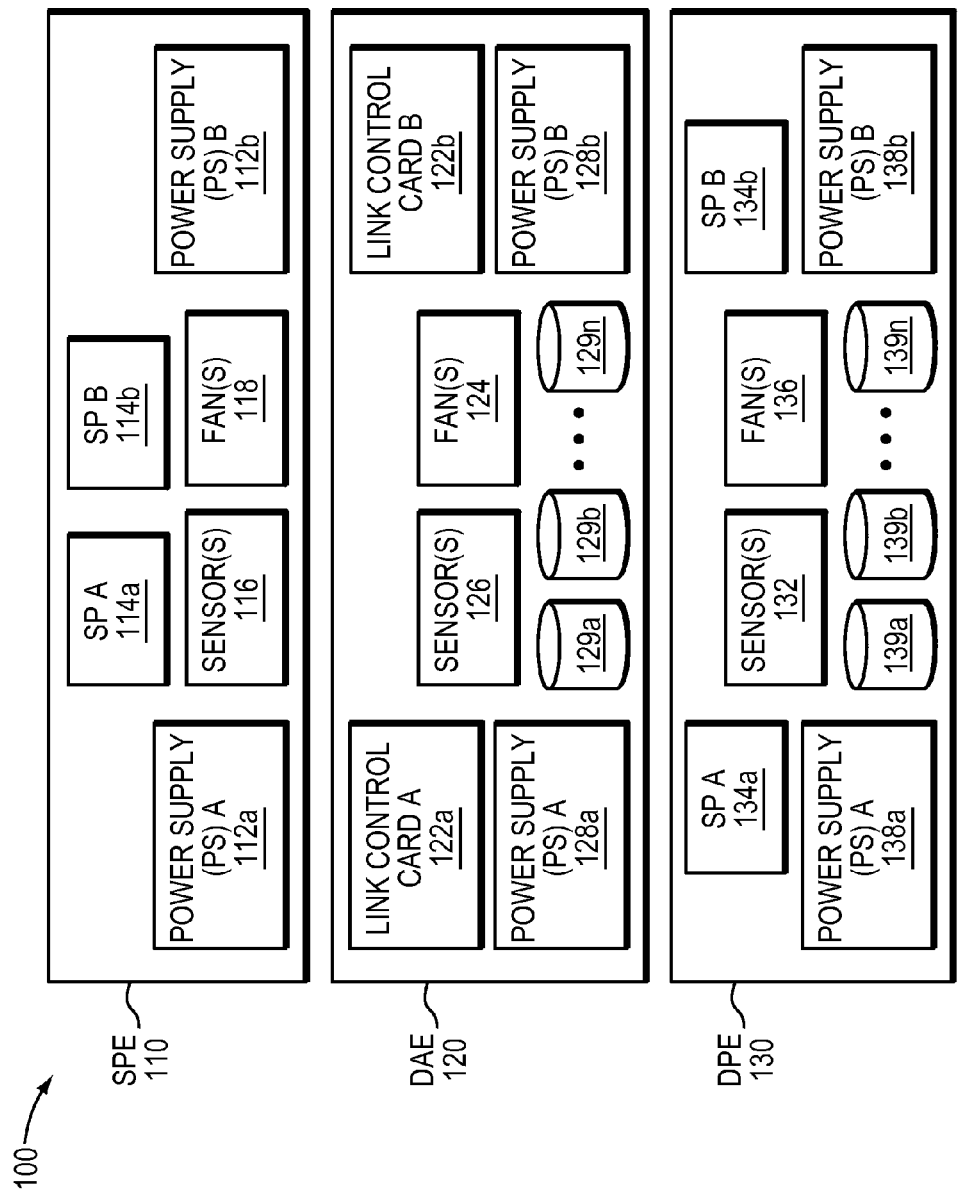
FIG. 2 is an example illustrating different enclosures and components thereof that may be included in the system of FIG. 1.

Referring to FIG. 2, there is illustrated an example of different types of enclosures that may be included in an embodiment of the system. The example 100 includes a storage processor enclosure (SPE) 110, a disk array enclosure (DAE) 120, and a disk array processor enclosure (DPE) 130. A data storage system may include, for example, an SPE and one or more DAEs, or a DPE and one or more DAEs.

An SPE 110 may include storage processors ("SPs") or central processing units ("CPUs) of the data storage system. In one embodiment, the SPE 110 may include two SPs denoted as SPs A and B (114a, 114b). The SPE 110 may also include two enclosure power supplies, power supply (PS) A 112a, PS B 112b, one or more sensors 116, and one or more fans 118. PS A 112a and PS B 112b may supply power to the components of the SPE 110. PS A 112a and PS B 112b may be powered by an external or primary power source, such as AC power provided by a source external with respect to the data storage system. The sensors 116 may include a temperature sensor that records the ambient temperature for the SPE 110. The SPE 110 may include other components than as illustrated in the example 100 for use with techniques herein.

A DAE 120 may include data storage devices of the data storage system. In one embodiment, the DAE 120 may include data storage devices 129a-129n, link control card (LCC) A 122a, LCC B 122b, one or more sensors 126, power supply (PS) A 128a, PS B 128b, and one or more fans 124. PS A 128a and PS B 128b may supply power to the components of the DAE 120. PS A 128a and PS B 128b may be powered by an external or primary power source, such as AC power provided by a source external with respect to the data storage system. The sensors 126 may include a temperature sensor that records the ambient temperature for the DAE 120. The DAE 120 may include other components than as illustrated in the example 100 for use with techniques herein. Each of the LCCs 122a, 122b may function as the interface between the components within the DAE and components outside or external to the DAE. Another enclosure, such as the SPE, may be connected to, and communicate with, the DAE through the LCCs 122a, 122b.

A DPE 130 may include storage processors ("SPs") or central processing units ("CPUs) and also storage devices of the data storage system. In one embodiment, the DPE 130 may include two SPs denoted as SPs A and B (134a, 134b). The DPE 130 may also include two enclosure power supplies, power supply (PS) A 138a, PS B 138b, one or more sensors 132, one or more fans 136, and data storage devices 139a-139n. PS A 134a and PS B 134b may supply power to the components of the DPE 130. PS A 134a and PS B 134b may be powered by an external or primary power source, such as AC power provided by a source external with respect to the data storage system. The sensors 132 may include a temperature sensor that records the ambient temperature for the DPE 130. The DPE 130 may include other components than as illustrated in the example 100 for use with techniques herein.

It should be noted that the one or more sensors of an enclosure may provide for obtaining one or more temperature measurements. As described above, a sensor may be used to record ambient temperature of air flowing into and/or surrounding the enclosure (e.g., indicative of the temperature of air external to the enclosure). A sensor may also be used to record the temperature within the enclosure. An embodiment may include one or more of the foregoing temperature sensors. Additionally, the power supplies within the enclosures illustrated in FIG. 2 may include an integrated sensor for sensing and reporting the amount of power utilized. However, an embodiment may alternatively include a power sensor as a separate sensor which is not integrated with the power supplies.

The data storage devices (e.g., denoted 129a-129n of the DAE 120 and 139a-139n of the DPE 130) may be any one or more types of data storage devices or drives having different data storage device characteristics. For example, in one embodiment, an enclosure may include FC (fibre channel) disk drives, SATA disk drives, or solid state drives (SSDs) such as flash-memory based storage drives. The number and/or type of devices included in an enclosure may also vary with the particular enclosure and/or embodiment.

In some embodiments, the data storage system may have two or more SPs. In one embodiment in which a data storage system has two SPs, the data storage system may include either the SPE or the DPE in combination with one or more DAEs. A DAE and a DPE may each have two enclosure power supplies and an SPE may have 2 or 4 enclosure level power supplies (although two are illustrated in elements 110 for exemplary purposes). As noted above, each such enclosure level power supply (PS) such as denoted by elements 112a, 112b, 128a, 128b, 138a and 138b, may be a primary power source such as AC power for components of the enclosure. Each PS of an enclosure may have two internal fans or blowers which are integrated with the PS as a single unit. Each enclosure may have 2-4 external fans. It should be noted that the foregoing numbers of components such as fans, CPUs or SPs, power supplies, and the like, are examples of what may be included in an embodiment in accordance with techniques herein.

In this embodiment, a SP or CPU of an SPE or DPE may connect to a DAE through an LCC of the DAE. The enclosures as illustrated may include replicate hardware components, such as two or more enclosure level power supplies, a DAE which includes two LCCs, an SPE or DPE including two SPs or CPUs, and the like. In an embodiment where an enclosure includes two SPs or CPUs, two LCCs and the like, a first of each of the pair may be denoted as the "A" components and a second of the pair may be denoted as the "B" components.

Figure 3:
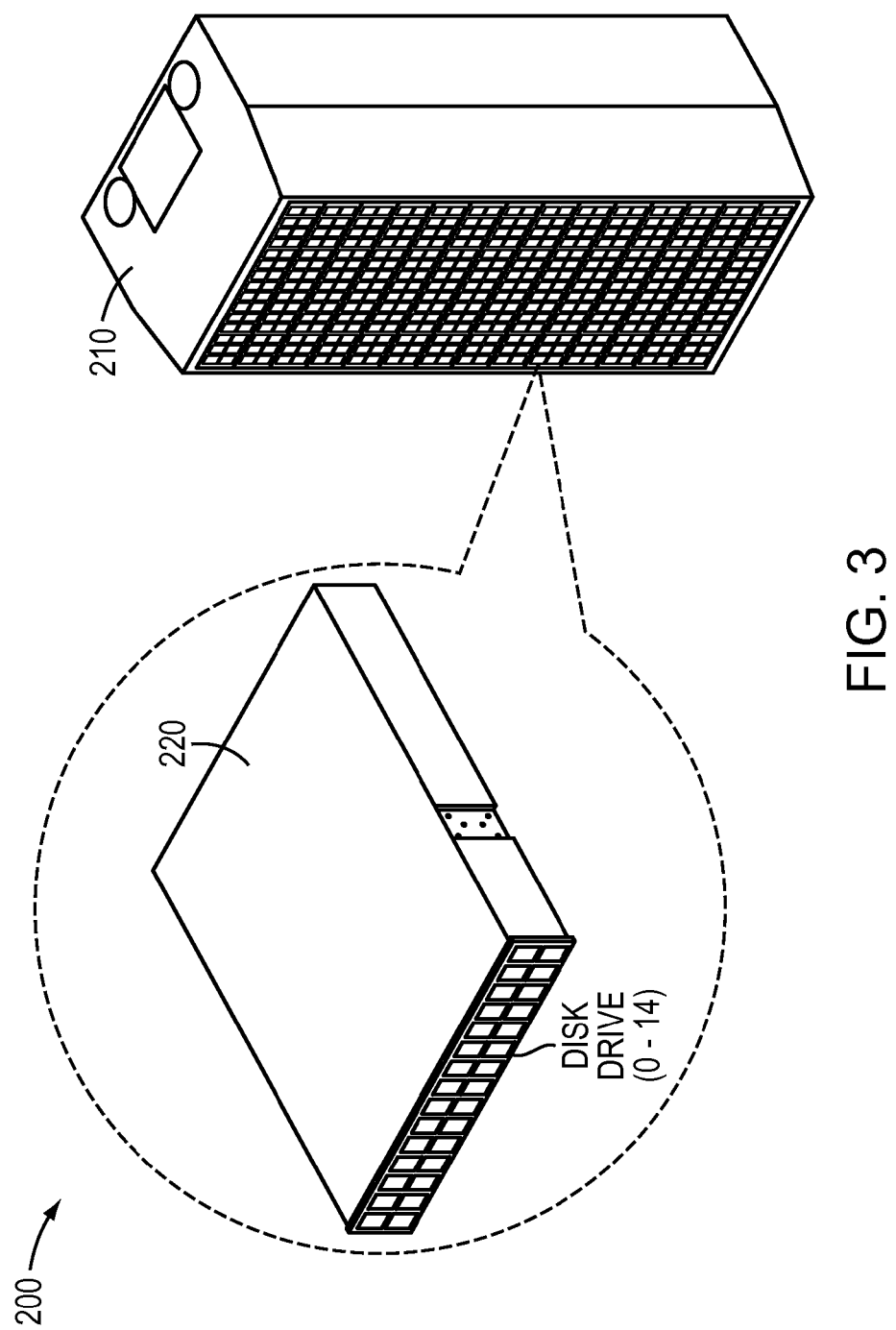
FIG. 3 is an example illustrating an arrangement of enclosures in a rackmount arrangement that may be included in the system of FIG. 1.

Referring to FIG. 3, there is illustrated an arrangement of enclosures in a rackmount arrangement that may be included in an embodiment of the system. The example 200 illustrates an exemplary rack mount configuration where the enclosures are included in racks in a rackmount cabinet 210. Each rack may include one of the enclosures such as illustrated by 220 where the enclosure may be a DAE illustrated as including disk drives 0-14. The different enclosures included in a data storage system may be connected to each other in a variety of different arrangements.

Figure 4:
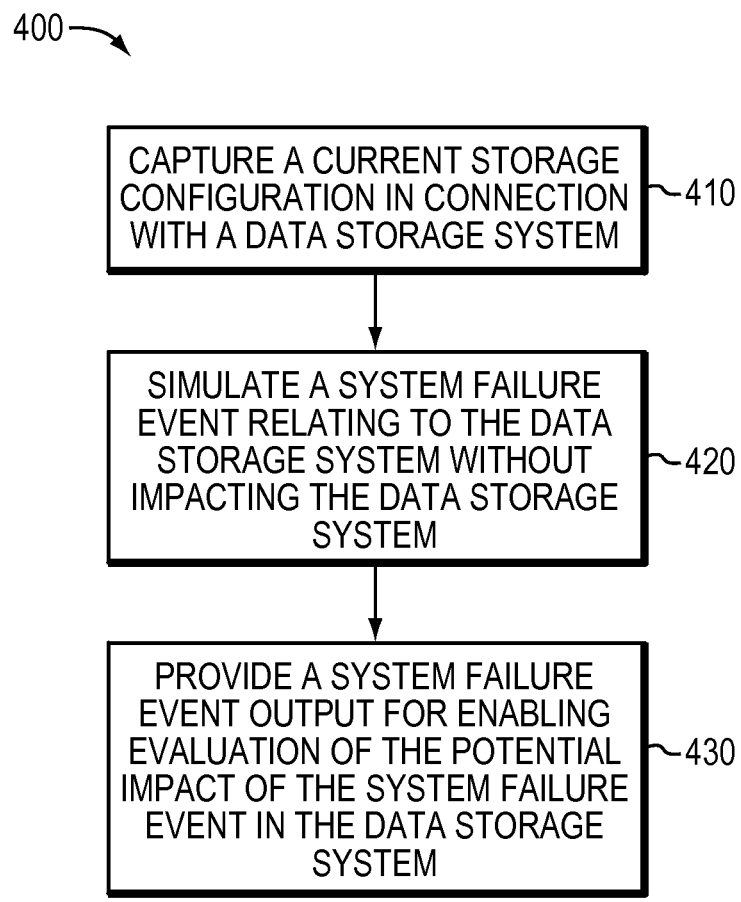
FIG. 4 is a flowchart summarizing the steps of the technique described herein.

Referring to FIG. 4, there is illustrated a technique 400 for use in evaluating a system event. The technique comprises capturing 410 a current storage configuration in connection with a data storage system 12. It will be appreciated that memory in the data storage system 12 can store the information relating to storage configuration. It will also be appreciated that in at least one embodiment the management system 16 can capture the current storage configuration from memory by requesting the information therefrom. In other words, the management system 16 can be configured for requesting the current storage configuration from memory of the data storage system 12. The management system 16 will in turn receive or collect or capture the information from the system 12. The information may include, without limitation, information relating to storage pool configurations, LUN configurations, application configurations, and the relationships therebetween. For example, the application configurations may include details regarding shared folders, e-mail applications, virtual applications and the like. The information may also include hardware information such as CPU details, memory details, data storage device details and the like in connection with the data storage system 12. For example, the data storage devices may be disk drives. It will also be understood that the technique may also capture further information such as information relating to deduplication, replication, tiering such as Fully Automated Storage Tiering (FAST) and the like. It will also be appreciated that when there is multiple data storage systems the data storage configuration data may also include relationships between systems.

The technique comprises simulating 420 a system failure event relating to the data storage system 12 without impacting the data storage system. In this embodiment, the system failure event can be simulated in the management system 16 using the captured current storage configuration in connection with the data storage system 12. It will be appreciated that the system failure event can be a hardware or software failure. In one embodiment, the system failure event may be a failure of at least one data storage device in the data storage system. In another embodiment, the system failure event may be a failure of at least one storage processor in the data storage system. In another embodiment, the system failure event may be a failure of at least one sensor in the data storage system. In another embodiment, the system failure event may be a failure of at least one fan in the data storage system. In another embodiment, the system failure event may be a failure of a link control card (LCC) in connection with the data storage system. In a further embodiment, the system failure event may be a failure of an array enclosure in connection with the data storage system. For example, the enclosure may be a DAE in a rack as described above. In a further embodiment, the system failure event may be the failure of a software update in connection with the data storage system. In a still further embodiment, the system failure event may be a network accessibility failure in connection with the data storage system.

The technique comprises providing 430 a system failure event output for enabling evaluation of the potential impact of the system failure event in the data storage system in response to simulating the system failure event. The system failure event output may also enable evaluation of the potential impact on applications associated with the data storage system. For example, the system failure event output may enable evaluation of the potential impact on applications such as a shared folder or an e-mail application or a virtual application. It will be appreciated that a graphical user interface can be provided for enabling evaluation of the potential impact of the system failure event by graphically displaying the impact of the system failure event in the data storage system. The graphical user interface may be provided by the management system 16 for enabling evaluation of the potential impact of the system failure event.

In one embodiment the technique as described herein may also provide help advice relating to the system failure event such that the help advice can assist in overcoming the potential impact of the system failure event in the data storage system. It will be appreciated that computer-aided help systems have been developed to provide assistance to computer users. It will also be appreciated that advanced help systems may display context-sensitive help. It will be understood that context-sensitive help systems may determine a particular problem the user faces and display help advice or information that is relevant to the user problem. For example, if a disk fails in the data storage system, the technique may provide the simple help advice that the failed disk be replaced with a good disk.

Advantageously, the technique as described herein can be used to clearly demonstrate how a failure event or a disaster event could negatively affect day to day operations in a business environment. The technique can also provide detailed information for recovery from these failures and can be very helpful for administrators in understanding the systems capability of withstanding certain risks with the current storage configuration in the data storage system. Needless to say, it will be appreciated that preparedness and a planned response to an event can reduce risk when real disaster occurs.

Figure 5A:
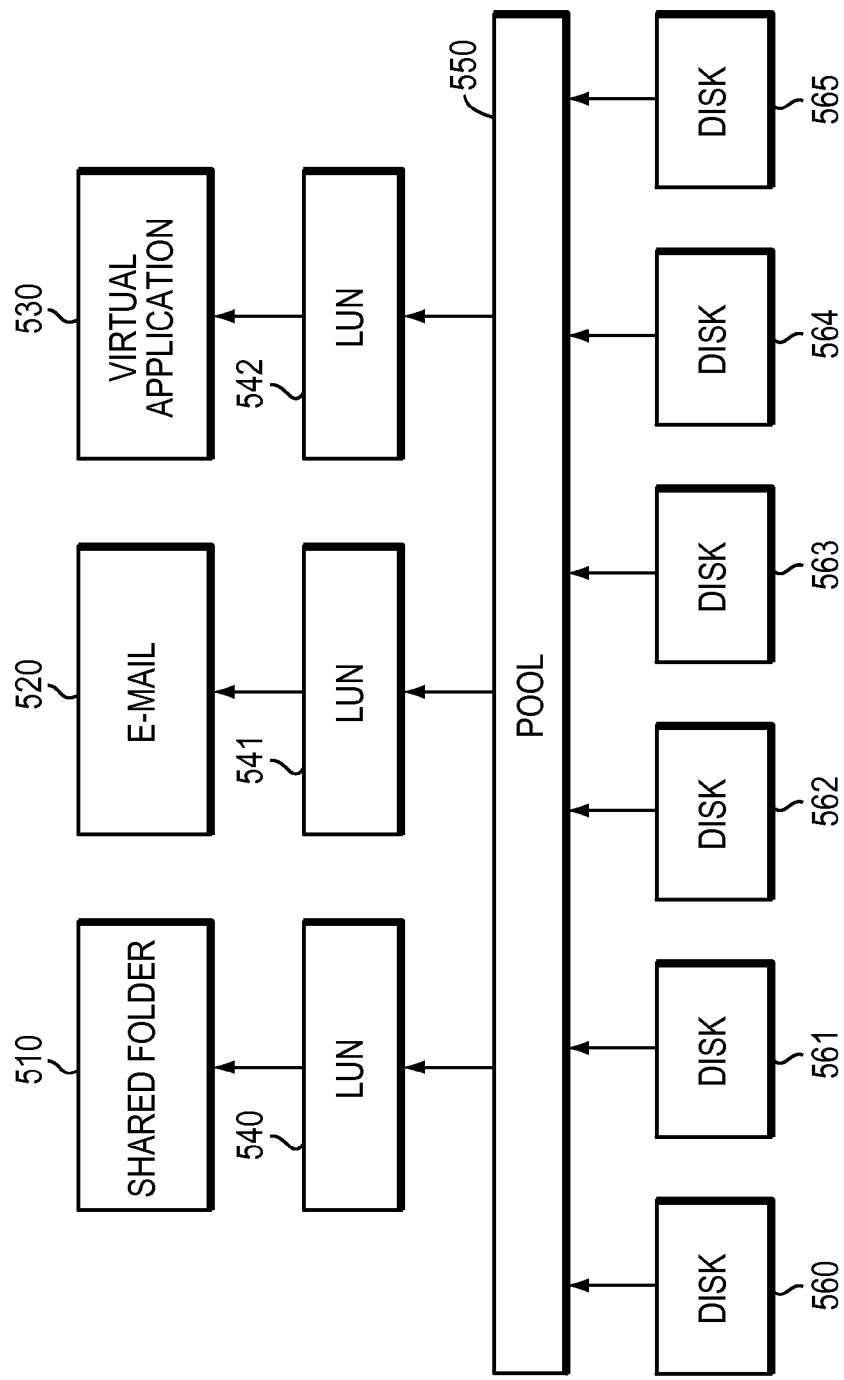
FIGS. 5(*a*) to (*c*) is an example illustrating the implementation of the technique as described herein.
Figure 5B:
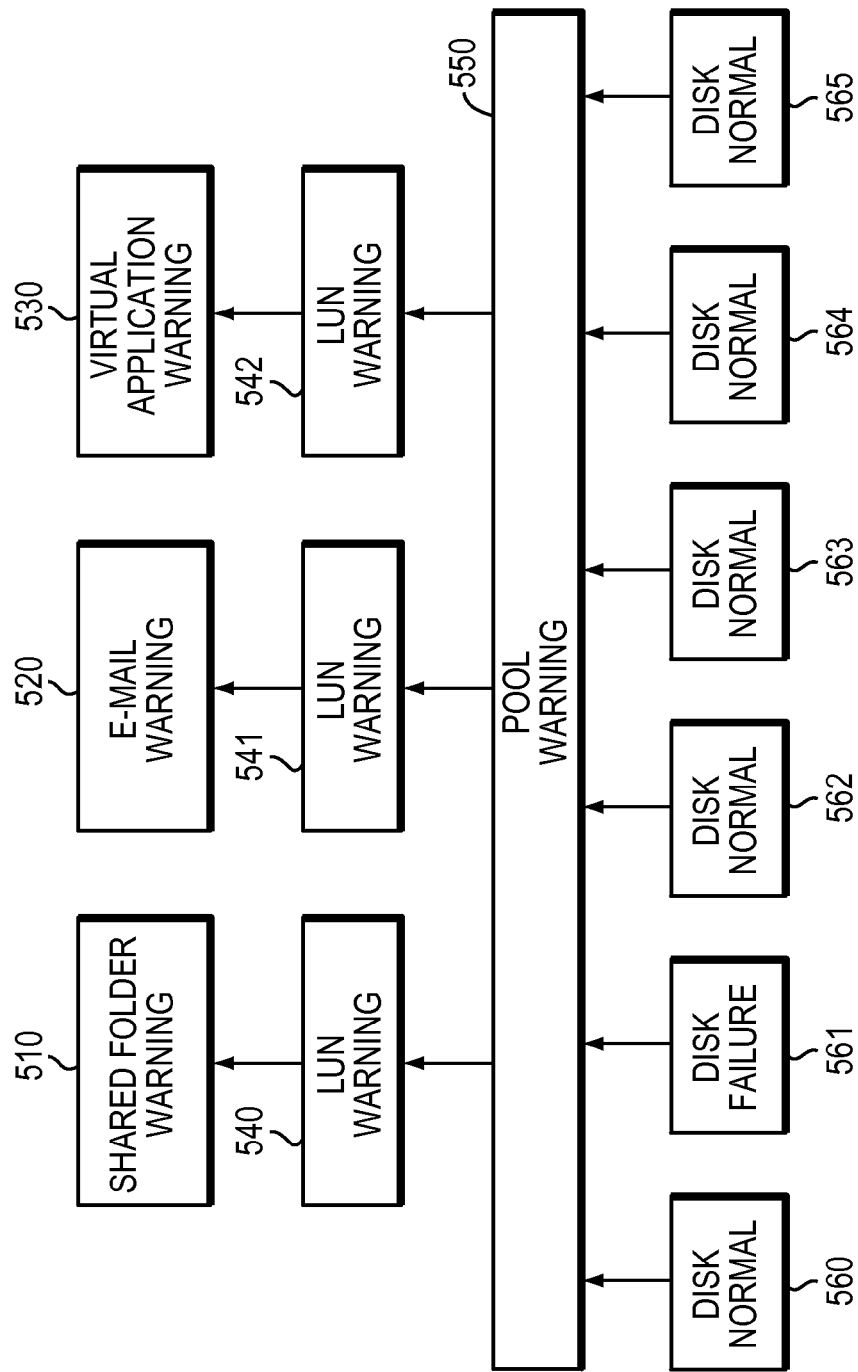
Figure 5C:
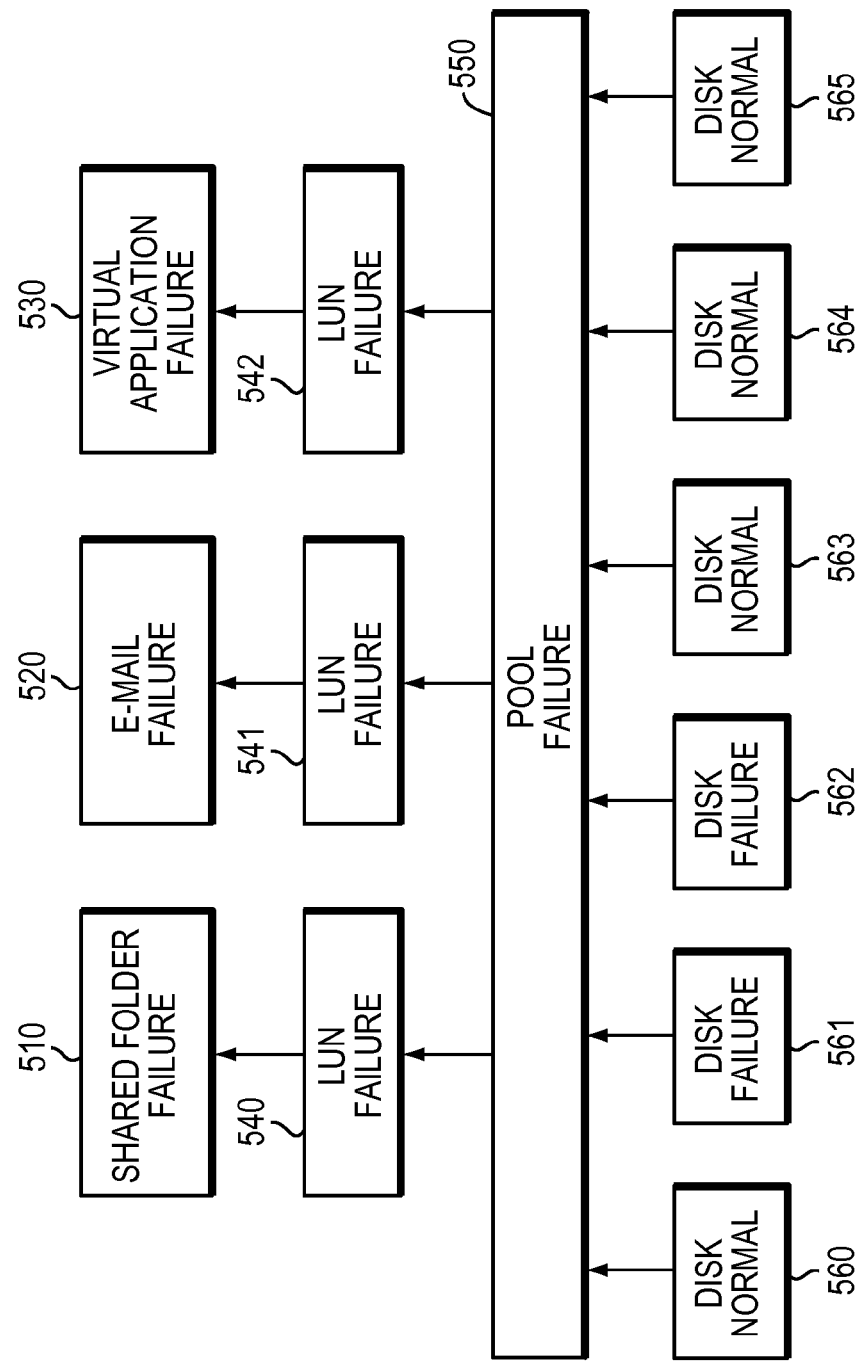

Referring to FIGS. 5(*a*) to (*c*), there is illustrated an example of the implementation of the technique as described herein. As described, the technique captures 410 the current storage configuration in connection with the data storage system 12. It will be appreciated, as described above, that the management system 16 may capture the configuration in connection with the data storage system 12. By capturing the storage configuration, the management system 16 may replicate the storage configuration in connection with the data storage system offline in the management system 16. The FIG. 5(*a*) illustrates the configuration comprising a performance storage pool 550 comprising six disks 560-565 in the data storage system 12. There is also illustrated three LUNs 540-542 associated with the pool 550 with one LUN 540 for a share folder 510, one LUN 541 for an email box 520 and one LUN 542 for a virtual application 530.

It will be appreciated from the foregoing description of the technique that the administrator can simulate 420 a system failure event relating to the data storage system 12 without impacting the data storage system 12. It will also be appreciated that in one embodiment the system failure event may be the failure of one of the disks 561 in the data storage system. The system failure event can be simulated in the management system 16 using the current storage configuration in connection with the data storage system 12 without affecting the data storage system. In this embodiment, the storage pool 550 may comprise a hot spare such that when one of the disks 561 fails the pool 550 will enter into a degraded state. The management system 16 is aware of the relationship between the disks 560-565, the pool 550, the LUNs 540-542, the shared folder 510, the email box 520 and the virtual application 530 so it can provide 430 a system failure event output for enabling evaluation of the potential impact of the failure of the disk 561 in the data storage system 12. It will be appreciated from FIG. 5(*b*) that the system failure event output may be provided on a graphical user interface for enabling evaluation of the potential impact of the failure of the disk 561 by graphically displaying the impact of the failure of the disk 561. It will be appreciated from the figure that the shared folder 510, the e-mail 520 and the virtual application 530 are at risk of data loss so a warning is associated with each of the three applications. It will also be appreciated form the figure that a warning is associated with the LUNs and the pool also.

Additionally, in this example, the administrator can simulate a second system failure event relating to the data storage system without impacting the data storage system 12. In this embodiment, the system failure event is the failure of a second disk 562 in the data storage system 12. It will be appreciated from the foregoing that in this example the pool 550 comprises only one hot spare so that the failure of the second disk 562 results in the failure of the pool 550, the failure of the LUNS 540-542, the failure of the shared folder 510, the failure of the email 520 and the failure of the virtual application 530. In such a scenario, the three applications cannot be accessed and remedial action is required.

While the management system has been described in detail with respect to FIG. 1, it may in some embodiments be implemented as a mobile portable remote management device such that users can continue their work when, for example, on a plane or out of the office.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for use in evaluating a system event, the method comprising:
   capturing, from a data storage system, a current storage configuration in connection with the data storage system, wherein the current storage configuration relates to physical and logical features;
   simulating offline a predetermined system failure event relating to the data storage system, wherein the system failure event is simulated using the captured current storage configuration in connection with the data storage system;
   in response to simulating the system failure event, providing a system failure event output for enabling evaluation of the potential impact of the system failure event in connection with the data storage system and the potential impact on an application associated with the data storage system, wherein the system failure event output comprises a loss report describing the potential impact of the system failure event in connection with the data storage system and the application associated with the data storage system; and
   in response to simulating the system failure event, providing help advice for facilitating recovery from the system failure event.

2. The method as claimed in claim 1, further comprising:
   providing a graphical user interface for enabling evaluation of the potential impact of the system failure event by graphically displaying the impact of the system failure event in the data storage system.

3. The method as claimed in claim 1, wherein the system failure event comprises an event relating to the data storage system selected from the group consisting of:
   failure of a data storage device in connection with the data storage system,
   failure of a storage processor in connection with the data storage system,
   failure of a fan in connection with the data storage system,
   failure of a sensor in connection with the data storage system,
   failure of a link control card (LCC) in connection with the data storage system,
   failure of an array enclosure in connection with the data storage system, and
   failure of a software update in connection with the data storage system.

4. The method as claimed in claim 1, wherein the current storage configuration comprises information relating to storage configuration selected from the group consisting of:
   storage pool configurations,
   LUN configurations,
   application configurations,
   CPU details,
   memory details, and
   data storage device details.

5. The method as claimed in claim 1, wherein the method is configured for evaluating the system event using a management system for managing the data storage system.

6. The method as claimed in claim 5, wherein the management system is remote of the data storage system.

7. The method as claimed in claim 6, wherein the management system comprises a portable mobile device.

8. A system for use in evaluating a system event, the system comprising:
   a processor comprising a program logic for carrying out the steps of:
   first logic capturing, from a data storage system, a current storage configuration in connection with the data storage system, wherein the current storage configuration relates to physical and logical features;
   second logic simulating offline a predetermined system failure event relating to the data storage system, wherein the system failure event is simulated using the captured current storage configuration in connection with the data storage system;
   in response to simulating the system failure event, third logic providing a system failure event output for enabling evaluation of the potential impact of the system failure event in connection with the data storage system and the potential impact on an application associated with the data storage system, wherein the system failure event output comprises a loss report describing the potential impact of the system failure event in connection with the data storage system and the application associated with the data storage system; and
   in response to simulating the system failure event, fourth logic providing help advice for facilitating recovery from the system failure event.

9. The system as claimed in claim 8, further comprising:
   fifth logic providing a graphical user interface for enabling evaluation of the potential impact of the system failure event by graphically displaying the impact of the system failure event in the data storage system.

10. The system as claimed in claim 8, wherein the system failure event comprises an event relating to the data storage system selected from the group consisting of:
   failure of a data storage device in connection with the data storage system,
   failure of a storage processor in connection with the data storage system,
   failure of a fan in connection with the data storage system,
   failure of a sensor in connection with the data storage system,
   failure of a link control card (LCC) in connection with the data storage system,
   failure of an array enclosure in connection with the data storage system, and
   failure of a software update in connection with the data storage system.

11. The system as claimed in claim 8, wherein the current storage configuration comprises information relating to storage configuration selected from the group consisting of:
   storage pool configurations,
   LUN configurations,
   application configurations,
   CPU details,
   memory details, and
   data storage device details.

12. The system as claimed in claim 8, wherein the system is configured for evaluating the system event using a management system for managing the data storage system.

13. The system as claimed in claim 12, wherein the management system is remote of the data storage system.

14. The system as claimed in claim 13, wherein the management system comprises a portable mobile device.

* * * * *